(12) United States Patent
Sardelli et al.

(10) Patent No.: US 11,345,220 B2
(45) Date of Patent: May 31, 2022

(54) ISOLATED FIXING SYSTEM FOR ACTUATORS

(71) Applicant: MAGNA CLOSURES INC., Newmarket (CA)

(72) Inventors: Dunia Sardelli, Leghorn (IT); Marco Taurasi, Leghorn (IT); Francesco Cumbo, Pisa (IT)

(73) Assignee: MAGNA CLOSURES INC., Newmarket (CA)

( * ) Notice: Subject to any disclaimer, the term of this patent is extended or adjusted under 35 U.S.C. 154(b) by 190 days.

(21) Appl. No.: 16/279,171

(22) Filed: Feb. 19, 2019

(65) Prior Publication Data
US 2019/0263233 A1 Aug. 29, 2019

Related U.S. Application Data

(60) Provisional application No. 62/634,968, filed on Feb. 26, 2018.

(51) Int. Cl.
*B60J 5/04* (2006.01)
*E05F 11/38* (2006.01)
*E05B 79/02* (2014.01)

(52) U.S. Cl.
CPC .......... *B60J 5/0468* (2013.01); *B60J 5/0463* (2013.01); *E05F 11/382* (2013.01); *E05B 79/02* (2013.01); *E05Y 2900/55* (2013.01)

(58) Field of Classification Search
CPC ...... B60J 5/0468; B60J 5/0463; B60J 5/0416; E05F 11/382; E05Y 2900/55; E05Y 2600/63; E05B 79/02; E05B 81/24
See application file for complete search history.

(56) References Cited

U.S. PATENT DOCUMENTS 3,352,524 A * 11/1967 Rossi ..................... B60R 1/068
                                                            248/278.1
4,007,516 A *  2/1977 Coules ................... F16B 21/04
                                                              411/349
6,435,489 B1     8/2002 Rice et al.
(Continued)

FOREIGN PATENT DOCUMENTS

CN       101379257 A       3/2009
CN       107524360 A       12/2017
(Continued)

OTHER PUBLICATIONS

Original and English translation of First Office Action for Chinese Patent Appl. No 201910137792.X dated Jun. 30, 2021.

*Primary Examiner* — Rick K Chang
(74) *Attorney, Agent, or Firm* — Dickinson Wright PLLC

(57) ABSTRACT

An isolated fixing system for attaching an actuator to a vehicle door including an actuator fixing clip having a head portion, an engagement portion, and a guide portion, an isolation grommet with a flange and a receiving portion configured to engage the fixing clip, and a receiver integrated with the actuator to secure the actuator to a vehicle. The system may include an actuator fixing clip, a head portion, an engagement portion, and a guide portion of the actuator fixing clip that may be configured to engage an opening in a vehicle door and that, when inserted into the vehicle door, may be rotatable via the head portion from an unlocked position to a locked position, fixing the actuator to the vehicle door.

20 Claims, 7 Drawing Sheets

(56) References Cited

U.S. PATENT DOCUMENTS

| | | |
|---|---|---|
| 7,294,986 B2 | 11/2007 | Marentette |
| 7,316,389 B2 | 1/2008 | Rawson |
| 7,810,281 B2 | 10/2010 | Warren, Jr. et al. |
| 8,485,491 B2 | 6/2013 | Visage et al. |
| 9,106,114 B2 | 8/2015 | Bendel et al. |
| 2008/0201920 A1 | 8/2008 | Jatzke |
| 2016/0348768 A1 | 12/2016 | Urano et al. |
| 2018/0320720 A1 | 11/2018 | Erices et al. |

FOREIGN PATENT DOCUMENTS

| | | |
|---|---|---|
| DE | 102008027510 B4 | 8/2013 |
| EP | 1243452 A1 | 9/2002 |
| JP | H0543173 Y2 | 10/1993 |
| JP | 2000282721 A | 10/2000 |
| KR | 1020130073580 A | 7/2013 |

\* cited by examiner

ISOLATED FIXING SYSTEM FOR ACTUATORS

CROSS-REFERENCE TO RELATED APPLICATION

This application claims the benefit of U.S. Provisional Patent Application No. 62/634,968, filed Feb. 26, 2018, titled "Isolated Fixing System for Actuators," which is hereby incorporated by reference in its entirety.

BACKGROUND

Field of the Invention

The present disclosure relates generally to a fixing system for actuators and, more particularly, to an isolated fixing system for actuators in a vehicle door.

Related Art

This section provides background information related to the present disclosure which is not necessarily prior art.

Passenger vehicle doors and other vehicular access hatches (e.g., trunk, liftgate, hood) are typically opened via a latch mechanism. The latch mechanism may be operated manually, by a user-operated handle, or by a powered actuator. The actuator may include a motor that may be electrically controlled. The actuator is typically installed in a vehicle door. In a vehicle, a door typically contains a "wet" and a "dry" area. The wet area is a portion of the door that may be exposed to the elements (e.g., water, dust) and the dry portion of the door is the portion that is protected from the elements (i.e., the interior of the vehicle). The wet portion of the area may include an outer panel that is the exterior body of the vehicle and an inner panel that provides internal structure for the door and provides suitable mounting locations for components such as an actuator (or other components such as a power retractable window mechanism).

During assembly of a vehicle, time is an important consideration. Another important consideration is ease of assembly. As much of vehicle assembly is performed manually, by human assemblers, a system for easily installing (i.e., fixing without the need for manipulating fasteners such as nuts and bolts) an actuator (or other vehicle component) is desirable. An actuator that is configured to receive the system that allows the actuator to be quickly, correctly, and easily installed in the vehicle door or vehicle door subassembly, such as a door module or door carrier is also desirable. It is further desirable that the system provide suitable strength and durability to withstand the loads applied to the actuator and its latch mechanism (or other component using the system). It is also desirable that the attachment devices include a one-way-only installation element to prevent improper installation of the system to the actuator and that the system provide for easy removal and re-installation for service, access, or maintenance, for example.

In view of the above, there remains a need to develop a system for installing an actuator using the isolated fixing system that addresses and overcomes limitations associated with known actuator fixing systems and devices. For example, there is a need for an isolated fixing system to provide for an actuator to be quickly, correctly, and easily attached to a vehicle door or other subassembly.

SUMMARY

This section provides a general summary of the present disclosure and is not a comprehensive disclosure of its full scope or all of its features, aspects and objectives.

The present disclosure provides an isolated fixing system for an actuator for a vehicle door including an actuator fixing clip having a head portion, an engagement portion, and a guide portion; an isolation grommet having a flange and a receiving portion configured to selectively engage the actuator fixing clip; and a receiver integrated with the actuator to selectively receive the isolation grommet, wherein the actuator fixing clip is configured for securing the actuator to a vehicle.

In a related aspect, the isolated fixing system for an actuator for a vehicle door may include an actuator fixing clip that may be configured to rotate between a locked position and an unlocked position when inserted in the isolation grommet.

In a related aspect, the isolated fixing system for an actuator for a vehicle door may include a head portion that may include a locking position indicator and, optionally, a second unlocking position indicator.

In a related aspect, the isolated fixing system for an actuator for a vehicle door may include a head portion that may include at least one projection for indicating a first locking position and a second unlocking position, where the projections may also aid in a user rotating the head portion.

In a related aspect, the isolated fixing system for an actuator for a vehicle door may include an engagement portion with at least one engagement tab of the actuator fixing clip that may engage the receiving portion of the isolation grommet when the actuator fixing clip is inserted into the isolation grommet.

In a related aspect, the isolated fixing system for an actuator for a vehicle door may include a guide portion of the actuator fixing clip that may be configured to engage structure adjacent an opening in a vehicle door.

In a related aspect, the isolated fixing system for an actuator for a vehicle door may include a guide portion of the actuator fixing clip, when inserted into the vehicle door, may be rotatable via the head portion from an unlocked position to a locked position, fixing the actuator to the vehicle door.

In a related aspect, the isolated fixing system for an actuator for a vehicle door may include an isolation grommet that may further include a pair of isolation grommet tabs configured to engage the receiver.

In a related aspect, the isolated fixing system for an actuator for a vehicle door may include a flange of the isolation grommet that may be configured to engage a first portion of the vehicle to seal against the first portion of the vehicle and prevent water from passing from the first portion of the vehicle to a second portion of the vehicle through the opening.

In a related aspect, the isolated fixing system for an actuator for a vehicle door may include a flange of the isolation grommet that may be deformable against a surface of the first portion of the vehicle.

In a related aspect, the isolated fixing system for an actuator for a vehicle door may include a receiver that may be disposed about the actuator.

In a related aspect, the isolated fixing system for an actuator for a vehicle door may include a receiver that may be configured to expand when the isolation grommet is inserted into the receiver.

In a related aspect, the isolated fixing system for an actuator for a vehicle door may include a receiver that may be further configured to contract upon the insertion of the isolation grommet into the receiver.

In a related aspect, the isolated fixing system for an actuator for a vehicle door may include a receiver that may include a pair of receiver tabs that selectively engage the isolation grommet tabs when the isolation grommet is inserted into the receiver.

In a related aspect, the receiver may include a pair of receiver tabs that selectively engage tabs of the isolation grommet when the isolation grommet is inserted into the receiver.

It is another aspect of the present disclosure to provide a method for using an isolated fixing system for an actuator for a vehicle door including attaching at least one receiver clip to the exterior body of the actuator, inserting an isolation grommet into the at least one receiver clip, causing the at least one receiver clip to expand upon contact with the isolation grommet and to retract around the isolation grommet when the isolation grommet is encompassed by the at least one receiver clip, inserting an actuator fixing clip into the isolation grommet and through an opening in a vehicle door configured to receive the actuator fixing clip, and rotating the actuator fixing clip within the isolation grommet and the opening in the vehicle door.

In a related aspect, the method for using an isolated fixing system for an actuator for a vehicle door may include rotating the actuator fixing clip to an unlocked position before inserting into the isolation grommet.

In a related aspect, the method for using an isolated fixing system for an actuator for a vehicle door may include determining, by a visual inspection of an indicator, the unlocked position disposed on the actuator fixing clip.

In a related aspect, the method for using an isolated fixing system for actuator for a vehicle door may include deforming at least a portion of the actuator fixing clip when inserting the actuator fixing clip through an opening in the vehicle door.

In a related aspect, the method for using an isolated fixing system for an actuator for a vehicle door may include rotating the actuator fixing clip to a locked position after inserting the actuator fixing clip into the isolation grommet.

In a related aspect, the method for using an isolated fixing system for an actuator for a vehicle door may include compressing a flange of the isolation grommet against a wet surface of the vehicle door.

In accordance with these and other aspects, an isolated fixing system for an actuator is provided for use in a motor vehicle having a vehicle body including at least one of doors, hatches, hoods, and trunks.

In a non-limiting embodiment, the isolated fixing system for an actuator includes an actuator with at least one receiver included in the housing of the actuator, the receiver configured to receive an isolation grommet and including a pair of receiver tabs. The isolation grommet is configured to engage the receiver and includes a pair of isolation grommet tabs and a deformable flange. An actuator fixing clip is configured to engage the isolation grommet and includes a head portion, an engagement portion, and a deformable portion. The head portion of the actuator fixing clip includes at least one indicator of a locked position relative to the position of the deformable portion. The engagement portion is configured to engage the isolation grommet when the actuator fixing clip is inserted into the isolation grommet. The guide portion of the actuator fixing clip is configured (such as with an inclinated plane) to engage an opening (e.g., an asymmetrical opening), in a vehicle door. The guide portion of the actuator fixing clip may be configured to selectively deform (i.e., change shape temporarily), upon encountering the opening in a vehicle door and be configured to return to its original shape (i.e., the shape of the guide portion before encountering the opening the vehicle door).

In accordance with yet another aspect, a fixing system for mounting a vehicle component to vehicle structure is provided, including a receiver defining an opening therein; a grommet disposed within the opening of the receiver, wherein the grommet includes a receiving portion having an opening therethrough, wherein the grommet is fixed relative to the receiver in a predetermined orientation via corresponding structure of the grommet and the receiver; and a fixing clip disposed through the opening of the grommet, wherein the fixing clip is rotatable between a first angular position and a second angular position relative to the grommet, wherein the first angular position permits installation and removal of the fixing system to and from the vehicle structure, and the second angular position fixes the fixing system to the vehicle structure and prevents removal from the vehicle structure.

In a related aspect, the grommet includes a flexible flange portion extending radially outward from the receiving portion, wherein the flange portion has a first condition and a second condition, wherein the flange flexes from the first condition to the second condition in response to pressing the flange against a surface of the vehicle structure.

In a related aspect, the fixing clip holds the flange in the second condition against the vehicle structure when the fixing clip is in the second angular position.

In accordance with yet another aspect, a method of installing a vehicle component to vehicle structure is provided, including the steps of providing a vehicle component having at least one receiver clip; inserting an isolation grommet into the at least one receiver clip and securing the isolation grommet within the at least one receiver clip; inserting a fixing clip through the isolation grommet and positioning the fixing clip in a first angular position relative to the isolation grommet; inserting the fixing clip at least partially through an opening of the vehicle structure when the fixing clip is in the first angular position; rotating the fixing clip to a second angular position and engaging a first surface of the vehicle structure with an engagement surface of the fixing clip; and retaining the grommet and fixing clip against the vehicle structure.

In a related aspect, the method includes pressing a flange portion of the grommet against a second surface of the vehicle structure in response to inserting the fixing clip at least partially through the opening, deforming the flange portion to a sealed condition around the opening, and retaining the flange portion in the sealed condition in response to rotating the fixing the clip the second orientation.

In a related aspect, the method includes flexing receiver tabs of the at least one receiver clip outward in response to inserting the isolation grommet into the at least one receiver clip, and positioning the receiver tabs against corresponding grommet tabs that extend radially outward from the grommet to secure the grommet in a predetermined orientation relative to the receiver clip.

In accordance with another aspect, there is provided a fixing system for securing an actuator to a vehicle, the fixing system including an actuator fixing clip having an engagement portion, and an isolation grommet configured to selectively engage the actuator fixing clip, the isolation grommet connected to the actuator, such that the actuator fixing clip is configured for securing the actuator to a vehicle.

In accordance with another aspect, there is provided a method of installing a vehicle component to vehicle structure, the method including the steps of providing a vehicle component, connecting a fixing clip to the vehicle component and positioning the fixing clip in a first angular position relative to the vehicle component, inserting the fixing clip at least partially through an opening of the vehicle structure when the fixing clip is in the first angular position, rotating the fixing clip to a second angular position and engaging a first surface of the vehicle structure with an engagement surface of the fixing clip, and retaining the fixing clip against the vehicle structure.

In accordance with each of the disclosed aspects, the isolated fixing system for an actuator functions to provide a secure attachment for an actuator to be joined to a vehicle door with a sealing function to prevent water and/or noise intrusion and permits the actuator to be quickly and easily joined to the vehicle door.

BRIEF DESCRIPTION OF THE DRAWINGS

Other advantages of the present disclosure will be readily appreciated, as the same becomes better understood by reference to the following detailed description when considered in connection with the accompanying drawings wherein.

DETAILED DESCRIPTION

In general, at least one example embodiment of an isolated fixing system for an actuator constructed in accordance with the teachings of the present disclosure will now be disclosed. The example embodiment is provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In the following embodiments of the disclosure, related processes, device structures, and technologies are described.

Figure 1A:
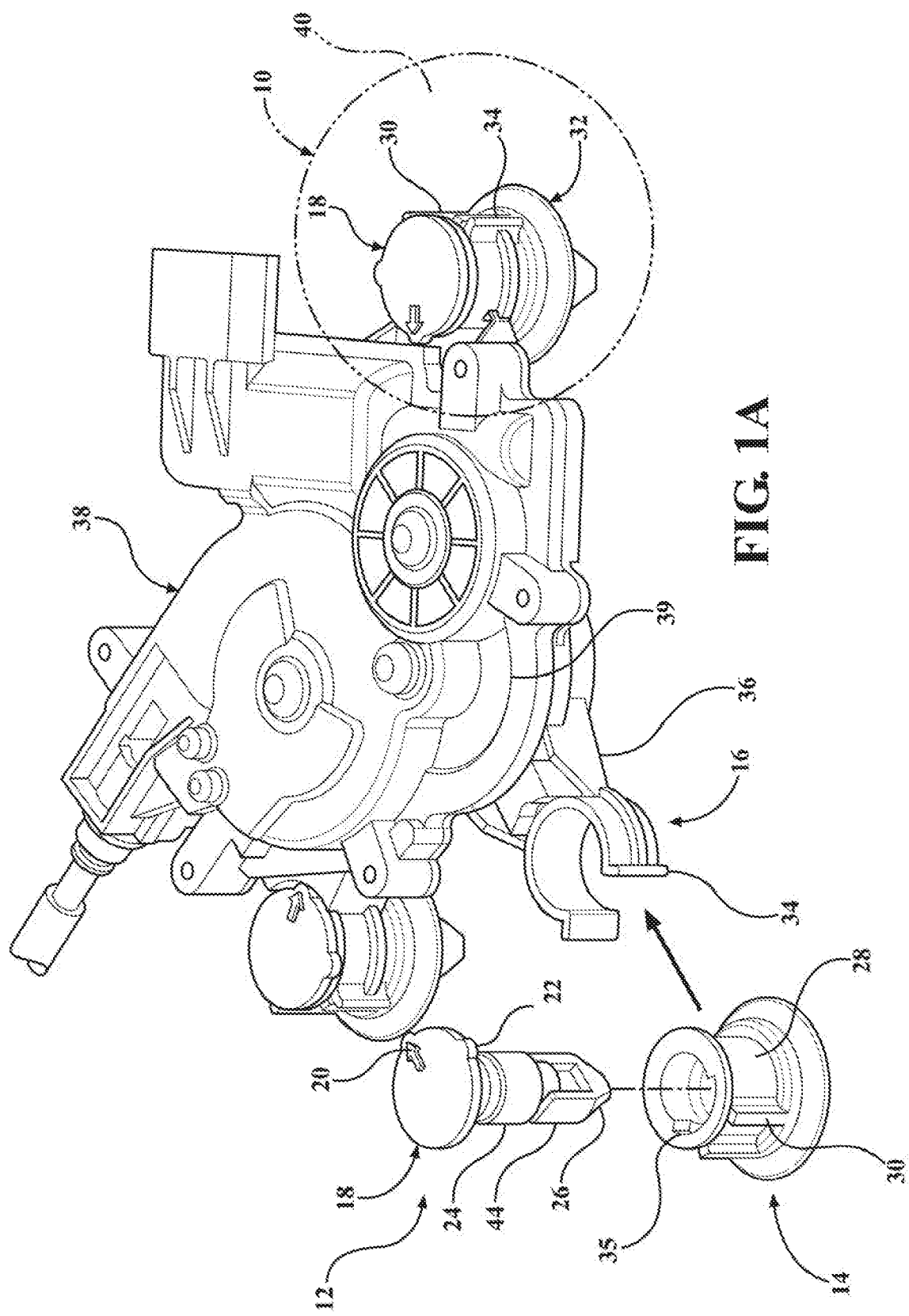
FIG. 1A is an exemplary illustration of an actuator for use with a vehicle door including embodiments of the isolated fixing system.
Figure 1B:
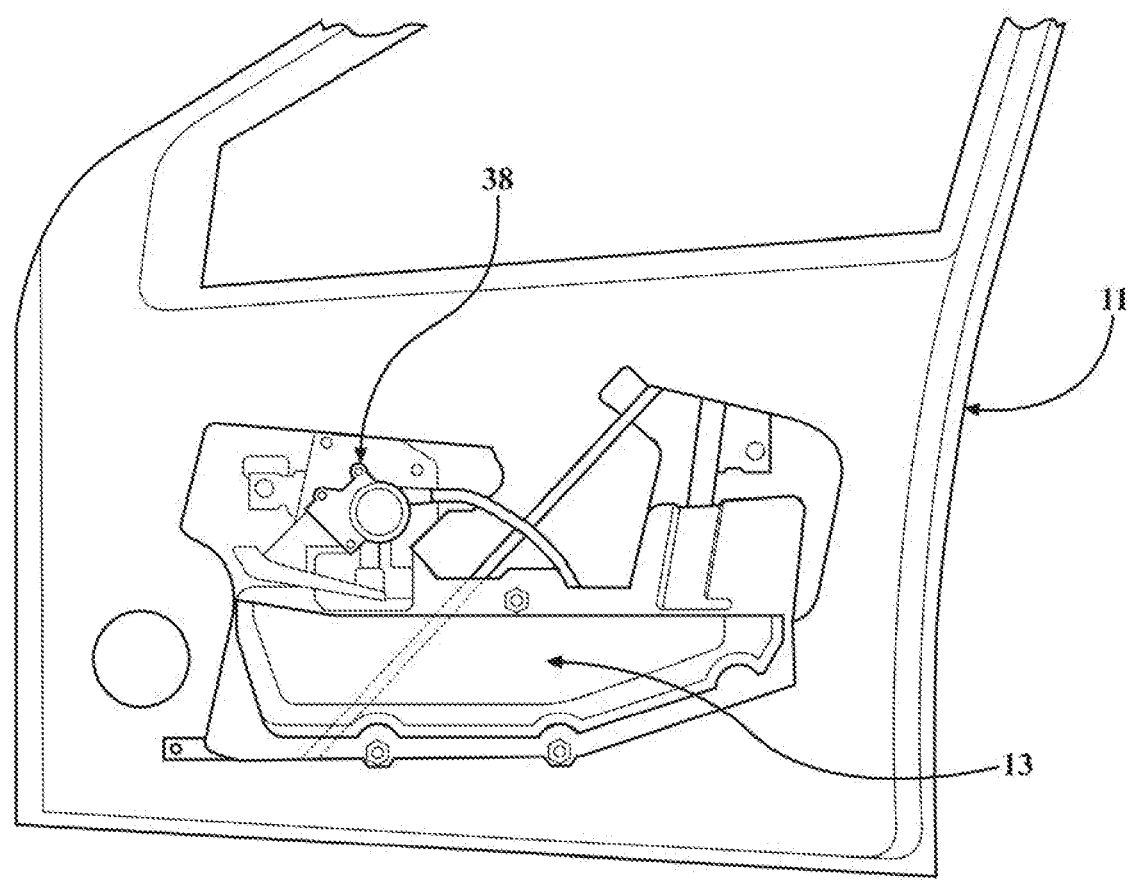
FIG. 1B is an exemplary illustration of the actuator of FIG. 1A fixed to a door module installed within a vehicle door.

Referring initially to FIG. 1A and FIG. 1B, one aspect of an isolated fixing system 10 is shown to include an actuator fixing clip 12, an isolation grommet 14, and a receiver 16. The system 10 may be configured such that the fixing clip 12 is received in the grommet 14, and the grommet is received in the receiver 16 in an assembled state, as further described below. The isolated fixing system 10 may be associated with various types of mountable vehicle components, such as an actuator 38, a control unit such as an ECU, a latch mechanism, a door module or carrier, a proximity sensor unit such as a capacitive, ultrasonic or radar sensing unit, or other mountable vehicle component.

In accordance with the present disclosure, the actuator 38 may be used for a vehicle door 11, with the actuator 38 shown connected to the receiver 16 via a gusset 36. Of course, it will be appreciated that the receiver 16 may be connected to the actuator 38 via other connection structure, either permanently or in a removable fashion. In one illustrative aspect, the actuator 38 may be a window regulator actuator as illustrated in FIG. 1B mounted to a door carrier 13 or door module 13, but may take other actuator forms such as cinch actuator, a lock actuator, or the like vehicle actuators.

The isolated fixing system 10 may have the features of being typically located or included as part of the actuator 38, such as via one or more gussets 36, which may be integrally formed with the actuator housing. It should be understood that isolated fixing system 10 may be integrated with the actuator 38 such that the gussets 36 may not be included. For example, isolated fixing system 10 may be incorporated throughout the actuator 38 and not only situated about the approximate perimeter of actuator 38 as shown in FIG. 1A. In another example, the fixing system 10 may be more closely disposed against the perimeter of the typical structure of the actuator 38 such that gussets are not necessary, where the receiver 16 structure abuts and/or is integrally formed with the outer housing structure of the actuator 38.

With further reference to the fixing clip 12, the actuator fixing clip 12 is shown having a head portion 18 in FIG. 1A. The head portion 18 may include one or more indicators 20 disposed on a visible surface when the fixing clip 12 is installed in the grommet 14, such as an upper surface of the head portion 18. As shown in FIG. 1A, the indicator 20 is in the form of an arrow. However, it will be appreciated that the indicator 20 may take on other forms, such as another shape, symbol, text, or color that identifies the indicator 20 relative to the remainder of the head portion 18 to provide an indicating function. The indicators 20 may be configured to correspond to an orientation (i.e., angular position), of other elements of actuator fixing clip 12, such as, but not limited to, guide portion 26. For example and without limitation, a first indicator 20 (shown in FIG. 1A as an arrow) may correspond to a locked or unlocked position of guide portion 26. A second indicator 20 may correspond to a different position of guide portion 26 relative to the first indicator 20. As shown in FIG. 1A, the indicator 20 may correspond to a specific position and/or orientation of guide portion 26, which is located at the bottom of the fixing clip 12.

As shown in FIG. 1A in one aspect, the indicators 20 disposed on the various fixing clips 12 and head portion 18 thereof have the arrow shape pointing in a direction that allows the fixing clip 12 to be inserted into the grommet 14, with the arrow of the indicator 20 being directed radially toward the actuator 38 in the illustrated example. The indicator 20 may be configured as other shapes, such as letters or other symbols. The indicator 20 may be used by the actuator assembly line assembler, to locate the fixing clip 12 in position assembly. Thus, in the illustrated example of FIG. 1A, an assembly line assembler may easily orient the fixing clip 12 such that it may be received through the grommet 14 (when the grommet 14 is received in the receiver 16) by pointing the arrow of the indicator 20 toward the actuator 38.

Additionally or alternatively, the head portion 18 may also include one or more projections 22 that project radially outward from the head portion 18, and the projections 22 may be engageable with a notch provided on the gusset 36 for locking the head portion 18 at select rotational positions. As with indicator 20, projections 22 may be configured to correspond to the orientation of, for example, the guide portion 26. Multiple projections 22 may be dispose don the head portion 18. As shown in FIG. 1A, two projections 22 are shown, with one of the projections corresponding circumferentially to the location of the indicator 20, and the other of the projections 22 being disposed approximately 90 degrees from the indicator 20. Accordingly, the combined projection 22 and indicator 20 may be inserted into the grommet 14, with the projection 22 holding the fixing clip 12 in an angular orientation via the notch. The fixing clip 12 may then be rotated 90 degrees, where the other projection 22 will engage the notch and hold the fixing clip in this rotated position.

It will be appreciated that additional indicators 20 and projections may be disposed on the head portion 18. For example, four projections 22 could be used that are evenly spaced around the perimeter of the head portion 18, and an additional indicator 20 may be disposed at a location diametrically opposed to the illustrated location of the indicator 20. Thus, the fixing clip 12 may be inserted into the grommet 14 at two different orientations (180 degrees different), and rotated in either direction to engage either of the other adjacent projections 22 after rotating 90 degrees. Other angular positions could also be used to control a desirable rotation in accordance with the needs of the particular assembly.

The projections 22 may also be configured to enable an operator/assembler to more easily grasp actuator fixing clip 12 and rotate actuator fixing clip 12 into a locked (or unlocked) position. Projections 22 may be configured about head portion 18 to facilitate installation, service, and/or maintenance. In another aspect, additional structure may be disposed on the head portion 18 to facilitate rotation of the fixing clip 12, such as a rib or knob or other graspable structure.

In another aspect, the actuator fixing clip 12 includes an engagement portion 24. The engagement portion 24 may be configured to extend from the head portion 18 to the guide portion 26 of the actuator fixing clip 12. The engagement portion 24 may include one or more profiles or elements (such as engagement tabs 44, described in detail below) for engaging a portion of vehicle door sheet metal 40. It will be understood that door sheet metal, as used in this disclosure, is only exemplary and not limiting. Other components of a vehicle are contemplated as using the isolated fixing system for actuators, such as, but not limited to, vehicle trunks, cargo boxes, fuel/charging doors, access panels, door modules or door carriers which may be as an example be formed from a plastic material, and hoods. In some examples, the profiles of the engagement portion 24 may include different diameters, shapes, ledges, grooves, notches, for example. The profiles or elements, such as the engagement tabs 44, may be arranged on the fixing clip 12 on opposite sides thereof, such that insertion of the fixing clip 12 is made possible in a first angular orientation, and upon rotation of the fixing clip 12, the tabs 44 will act to retain the fixing clip 12 against the door sheet metal 40 (or other structure/material through which the engagement portion 24 passes during installation).

Figure 7B:
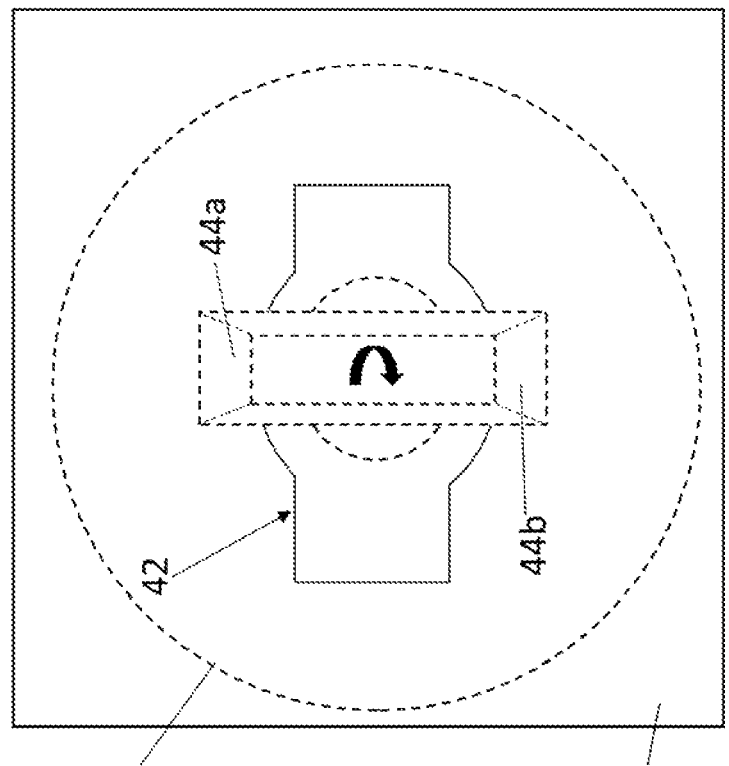
FIGS. 7A and 7B show an illustrative opening in a vehicle, in accordance with an illustrative embodiment.
Figure 7A:
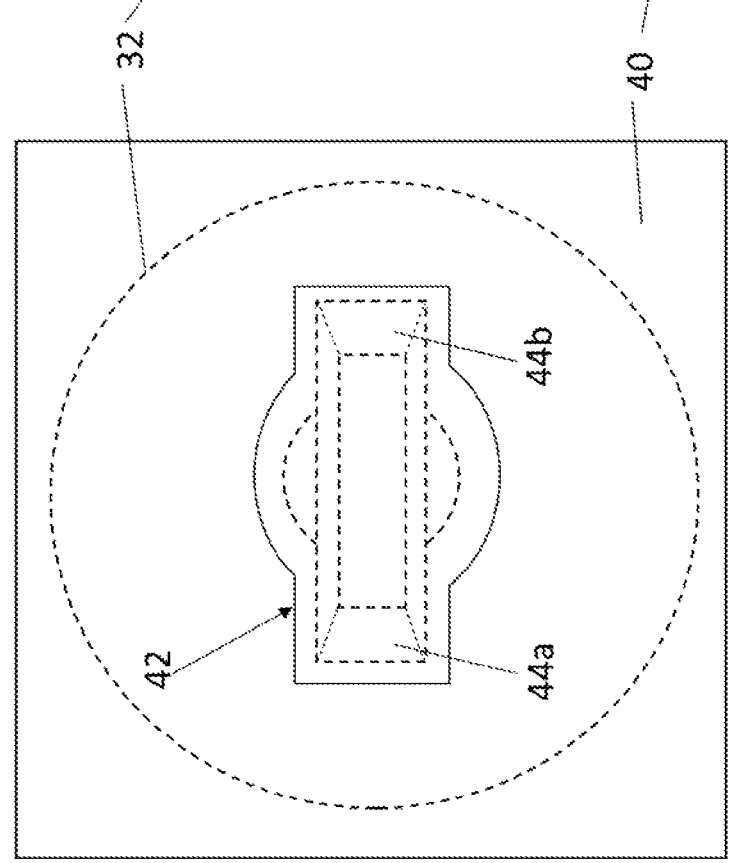

A shown, the actuator fixing clip 12 includes the guide portion 26, which was also described previously above in relation to the indicator 20. The guide portion 26 may be disposed adjacent to the engagement portion 24 and/or the engagement tabs 44 at the opposite end of actuator fixing clip 12 from head portion 18. The guide portion 26 may be configured to include a ramp, wedge, cone, or inclinated plane that may facilitate engagement with an opening 42 (one example shown in FIGS. 2A-2C and 3) in the vehicle door sheet metal 40. Opening 42 may be shaped to be able to receive and allow passage of engagement tabs 44, for example two oppositely provided engagement tabs 44*a*, 44*b*, there through when the engagement tabs are in an unlocked position, and shaped to prevent engagement tabs 44 from being removed through opening 42 when engagement tabs 44 are in a locked position. An illustrated shape of opening 42 with engagement tabs 44 in ghosted views showing its locked position engaging the surface surrounding the opening 42 and unlocked position is shown in FIG. 7A and FIG. 7B, in accordance with an illustrative example. The guide portion 26 may assist an assembler in locating the openings 42 during an installation process, which may be done by touch or feel during a blind installation where the assembler cannot easily visually view the openings 42, as well during an assembly where visibility of the openings 42 is not obstructed to the installer. The ramp shape of guide portion 26 may permit an operator/assembler to more easily insert actuator fixing clip 12 into opening 42 of vehicle door sheet metal 40. Guide portion 26 may be configured in other shapes, such as a cone or tapered cylinder, for example. The openings 42 in the panels 40 may have a predetermined pattern, and the fixing clips 12 may also have a matching pattern when installed in the system 10 and oriented in an installation position in accordance with the desired orientation of the indicators 20. Thus, during installation, the matching patterns and shape of the guide portion 26 will ensure accurate placement and ease of passage through the door sheet metal 40.

Turning now to the isolation grommet 14, the isolation grommet 14 may include a receiving portion 28. The receiving portion 28 is configured to accept the insertion of actuator fixing clip 12, including engagement portion 24 and guide portion 26. Receiving portion 28 may be made of a plastic or rubber material or of metal, or a combination thereof. The receiving portion 28, in one form, may have a generally tubular shape, such that the fixing clip 12, having a post-like shape, may extend through the receiving portion 28 and be received therein.

The isolation grommet 14 may also include a pair of isolation grommet tabs 30. The grommet tabs 30 may extend radially outward from an outer surface of the receiving portion, and may act as locating or installation structure for the grommet 14 to be installed in the receiver 16 at a desired orientation. The isolation grommet tabs 30 may be configured to engage a pair of receiver tabs 34 of receiver 16, as described below. The isolation grommet 14 may also include one or more alignment features 35 for the installation of the actuator fixing clip 12 and for controlling rotation of the actuator fixing clip 12 when received therein.

Figure 2A:
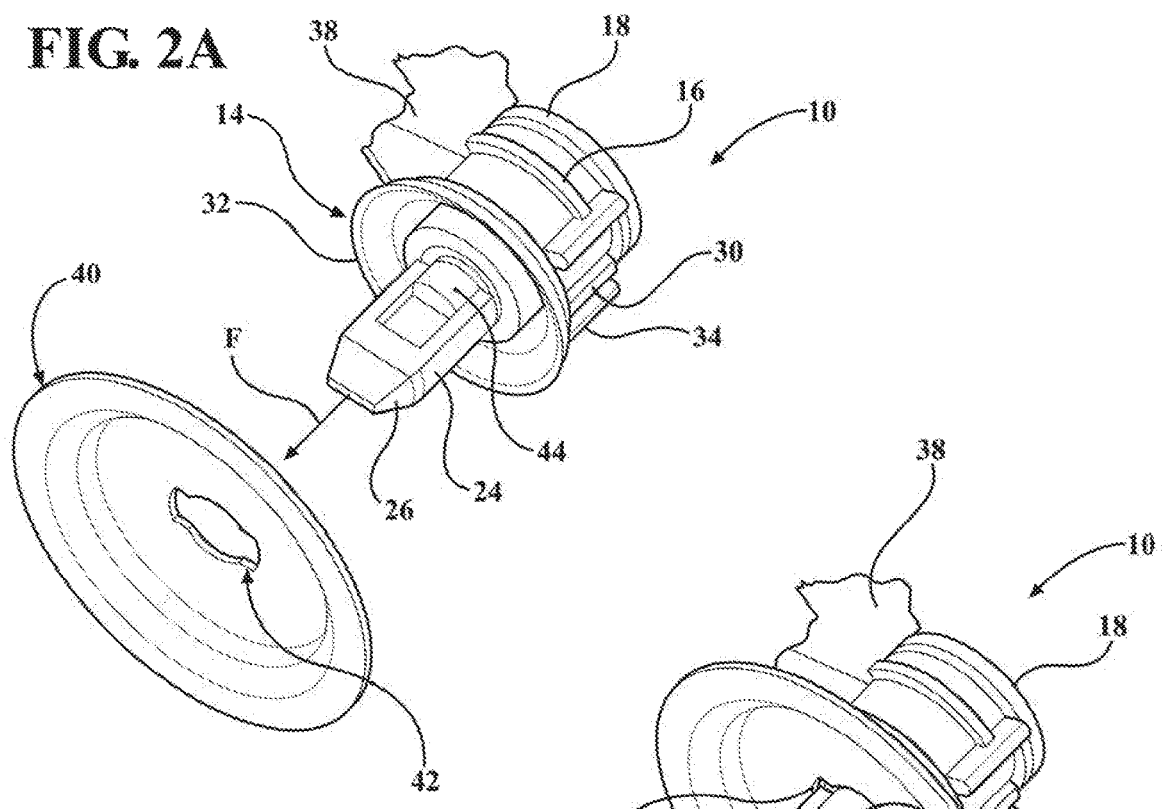
FIG. 2A is a diagrammatic view of an embodiment of the isolated fixing system including a portion of a vehicle door sheet metal plate with an opening configured to engage a portion of the isolated fixing system.
Figure 2B:
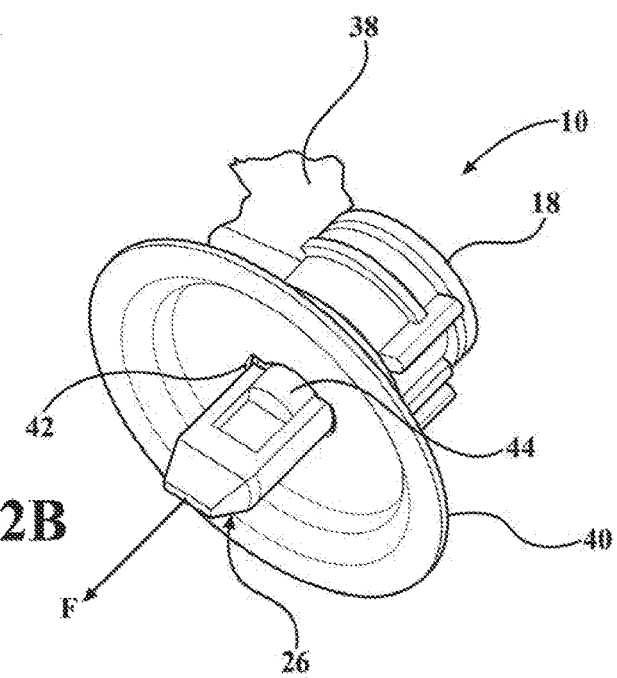
FIG. 2B is a diagrammatic view of the embodiment of FIG. 2A, shown inserted through the opening.
Figure 2C:
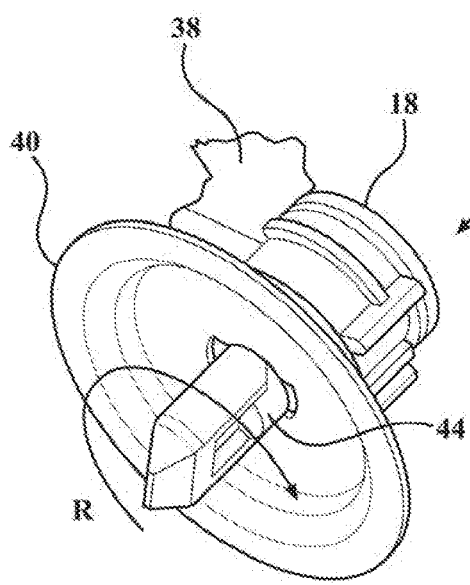
FIG. 2C is a diagrammatic view of the embodiment of FIGS. 2A-2B, shown rotated into the locked position.

In one aspect, isolation grommet 14 includes a flange 32 adjacent to receiving portion 28 and opposite the end of the receiving portion 28 that receives the fixing clip 12. The flange 32 may be configured to be deformable (i.e., flexible and resilient) such that flange 32 may deform against vehicle door sheet metal 40 when the actuator fixing clip 12 is inserted into isolation grommet 14 once installed in receiver 16 and rotated into a locked position (as shown in FIGS. 2A-2C, for example). The flange 32 may have a downward cup-like shape, such that it is concave toward the sheet metal 40 when installed, where the outer perimeter of the flange 32 may flare radially outward when pressed against the sheet metal 40 during installation.

Flange 32 may therefore act as a gasket once deformed via the insertion and rotation of actuator fixing clip 12, preventing water and/or noise (or other undesired materials) from passing from the "wet" side W of the vehicle door sheet metal 40 to the "dry" side D (see for example, FIG. 3) of vehicle door sheet metal 40 (e.g., the interior of the vehicle). Thus, flange 32, by nature of its deformation, may perform similar to a gasket and form a seal against vehicle door sheet metal 40. The flange 32 may also assist with eliminating noise caused by vibration since the isolation grommet 14 is securely maintained against the vehicle door sheet metal 40, thereby preventing any movement therebetween. The flange 32 may also act as a vibration damper to dampen vibration of the actuator 38 (or other component).

With reference now to the receiver 16, the receiver 16 is shown connected by a gusset 36 to actuator 38. As detailed above and throughout, isolated fixing system 10 may be configured about the perimeter of actuator 38, in one approach. However, it will be appreciated that the fixing system may be disposed at other locations of the component to which it is attached, and is not limited to perimeter-based installations. The receiver 16 may be flexible to the extent that insertion of isolation grommet 14 in a direction toward the receiver may cause receiver 16 to expand and then retract once isolation grommet 14 is inserted. More particularly, the receiver tabs 34 may be in the form of flexible fingers/arms that flex outward in response to forcing the outer surface of the grommet 14 between the tabs 34, and will flex back toward a nominal shape to retain the grommet 14. Thus, the receiver 16, and the tabs 34 thereof, may be flexible and resilient to accommodate the installation of the grommet 14.

In other embodiments, the receiver 16 may be rigid and not deform (but may deflect) when isolation grommet 14 is inserted. In still other embodiments, receiver 16 may not deform or deflect when isolation grommet 14 is inserted. The receiver 16 may also include the pair of receiver tabs 34 described above. Receiver tabs 34 may be positioned adjacent to an opening in receiver 16 (as shown in FIG. 1A, for example). Receiver tabs 34 may be configured to assist (i.e., guide), in the insertion of isolation grommet 14 into the receiver 16, such as by an operator or assembler. The receiver tabs 34 may also be configured to engage the pair of isolation grommet tabs 30 (also as shown in FIG. 1A), such that the grommet tabs 30 will abut the ends of the receiver tabs 34. The receiver tabs 34 may also prevent isolation grommet 14 from moving (i.e., rotating), once installed in receiver 16 based on the abutment between the grommet tabs 30 and the receiver tabs 34.

Thus, the fixing clip 12, grommet 14, and receiver 16 may combine to act as part of the fixing system 10 for fixing or installing an actuator 38 or other component to a mounting structure, such as door sheet metal 40. The various structure described above for the fixing clip 12, the grommet 14, and the receiver 16 may operate to ensure a desired orientation of each of the components when the components are installed together, such that the grommet 14 is positioned in a desired orientation relative to the receiver 16, and the fixing clip 12 is positioned in a desired location relative to the grommet 14. Accordingly, when assembled, the fixing system 10 may be used to locate the actuator 38 or other component on the door sheet metal 40 or other mounting structure based on a predetermined hole pattern, and the fixing clips 12 can thereafter be rotated and oriented to a position that retains the fixing system 10 (and the actuator 38 or other component) in place at the desired location. The installation process is described in further detail below.

Referring now to FIGS. 2A-2C, an exemplary assembly process of the isolated fixing system 10 is illustrated. The actuator fixing clip 12 (see, for example, FIG. 1A) is shown installed in isolation grommet 14, which is securely held by receiver 16. The receiver 16 is integrated with actuator 38 or otherwise fixedly secured to the actuator 38. The combination of actuator fixing clip 12, isolation grommet 14, and actuator 38 (with receiver 16) is positioned near to vehicle door sheet metal 40 with opening 42. As the combination is inserted toward the door sheet metal 40 and openings 42 by force F, guide portion 26 of the fixing clip 12 first encounters opening 42 and passes through opening 42, followed by engagement portion 24 with engagement tabs 44. The inclined surface of the guide portion 26 may ease the guide portion 26 through the opening 42 even if the guide portion 26 is not perfectly aligned with the opening 42.

The fixing clip 12 is inserted through the opening 42, and the grommet 14 and receiver 16 are moved toward the sheet metal 40, until engagement tabs 44 have passed through opening 42. At this position, the flange 32 of the grommet 14 may contact the surface of the sheet metal 40 and flare outward in response to the applied force. At this position, with the engagement tabs 44 having passed through the openings 42, the actuator fixing clip 12 may be rotated, for example by turning head portion 18, causing the engagement portion 24 and the engagement tabs 44 to rotate against vehicle door sheet metal 40 adjacent to opening 42. An engagement surface 45 of the engagement tabs 44 (shown in FIG. 5) may be in the form of a ramp surface, which may slide across the sheet metal surface during rotation of the engagement tabs 44.

The force F causes flange 32 to deflect or flare outward (i.e., deform), against the "wet" side of vehicle door sheet metal 40 and a rotation R of actuator fixing clip 12 from an "unlocked" position to a "locked" position maintains the deflection of flange 32 against the "wet" side W of vehicle door sheet metal 40 and secures actuator 38 in position. It will be appreciated that the actuator 38 and the fixing system 10 may be removed from position on the "wet" side W of vehicle door sheet metal 40 by reverse operation. Moreover, it will be further appreciated that the actuator 38 or other component having the fixing system 10 may be used on other mounting surfaces that are not necessarily "wet" or "dry" surfaces, and that any mounting panel with non-circular openings may be used with the fixing system 10.

Figure 3:
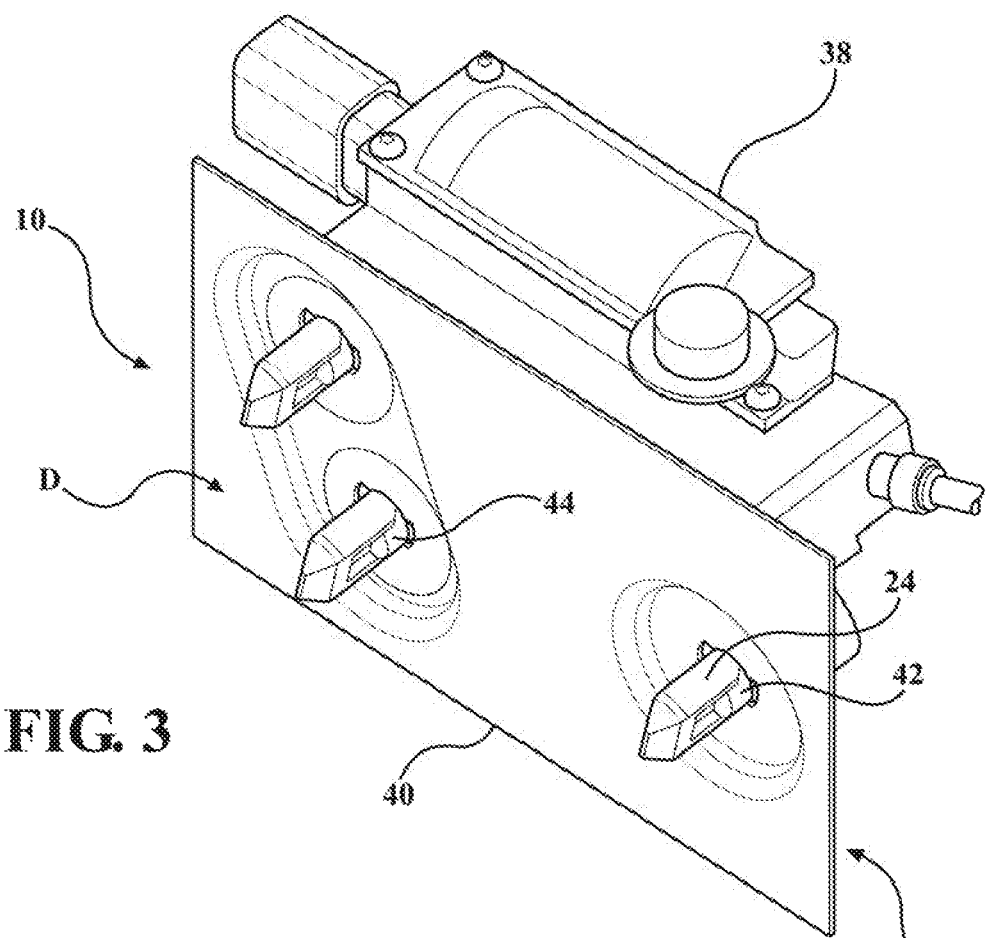
FIG. 3 is a diagrammatic view of the embodiment shown in FIGS. 2A-2C, shown engaging a section of a vehicle door, the embodiments attached to an actuator.

Referring now to FIG. 3, an example of the actuator 38 having three fixing clips 12, grommets 14, and receivers 16 is shown. The fixing clips 12 are shown projecting through the door sheet metal 40. As shown in FIG. 3, the fixing clips 12 are arranged in an asymmetrical pattern such that a predetermined orientation of the actuator 38 relative to the sheet metal 40 may be achieved easily. The three actuator fixing clips 12 of isolated fixing system 10 are shown engaging vehicle door sheet metal 40 via engagement portions 24, engagement tabs 44, and openings 42. The fixing clips 12 are shown in a "rotated" position, such that the actuator 38 will be retained. To permit removal of the actuator 38 from the sheet metal 40, the fixing clips 12 may be rotated 90 degrees from the orientation shown in FIG. 3, thereby permitting the engagement portions 44 to pass through the non-circular openings 42. As illustrated in FIG. 3, several isolated fixing systems 10 may be used to attach (or fix) actuator 38 to the "wet" side W of vehicle door sheet metal 40, opposite the "dry" side D, such as the interior of the vehicle. Of course, it will be appreciated that the fixing system 10 is not limited to installing the actuator 38 on the "wet" side of the door sheet metal 40. Regardless of which side of the sheet metal 40 the fixing system 10 is applied to, the force F exerted on the grommet 14 may create a seal around the opening 42 via the flange 32, such that one side of the sheet metal 40 is sealed from the opposite side.

Figure 4:
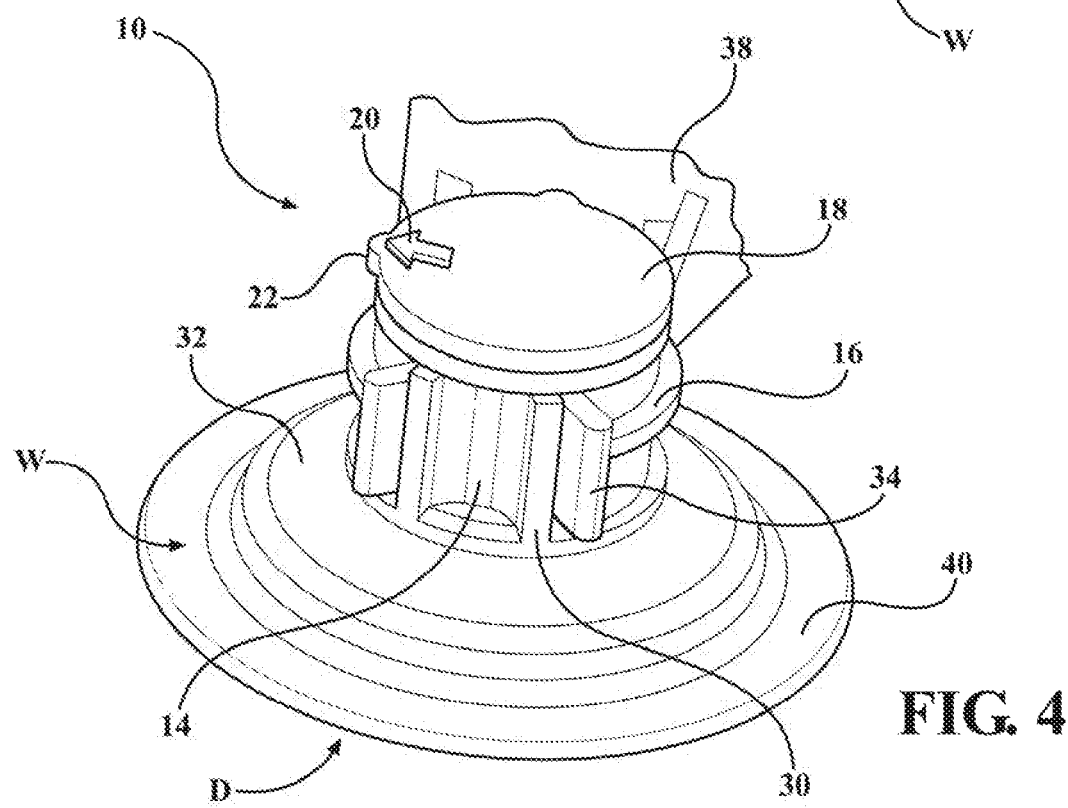
FIG. 4 is a diagrammatic view of an embodiment of the isolated fixing system, showing the system joining an actuator to a portion of a vehicle door sheet metal.

FIG. 4 illustrates an embodiment of the isolated fixing system 10 in an assembled configuration, shown from the "wet" side of vehicle door sheet metal 40 (see FIG. 3). Actuator fixing clip 12 is shown inserted into isolation grommet 14 (see FIGS. 2A-2C). Isolation grommet 14 is shown installed in receiver 16, with isolation grommet tabs 30 engaging receiver tabs 34. Indicator 20 and projection 22 both show (in this embodiment) that actuator fixing clip 12 is in a "locked" or installed position, securing actuator 38 to vehicle door sheet metal 40. FIG. 1A illustrates the indicator 20 at an "unlocked" position, allowing the fixing clip 12 and engagement portion to pass through the opening 42 prior to rotating the fixing clip 12 to the "installed position shown in FIGS. 3 and 4. In FIG. 4, the flange 32 of isolation grommet 14 is shown deformed and sealing against the "wet" side W of vehicle door sheet metal 40 via the deformation (or deflection) of flange 32 due to the insertion of actuator fixing clip 12 through opening 42 of vehicle door sheet metal 40 (as shown in FIGS. 2A-2C) to the extent that engagement tabs 44 of the fixing clip 12 extend beyond the "wet" side W of vehicle door sheet metal 40 to the "dry" side D of vehicle door sheet metal 40 and allow actuator fixing clip 12 to be rotated via head portion 18. As shown in FIG. 4, flange 32 is drawn (and held) against the "wet" side W of vehicle door sheet metal 40 by engagement tabs 44 interacting with the "dry" side D of vehicle door sheet metal 40, as shown in FIG. 3.

Figure 5:
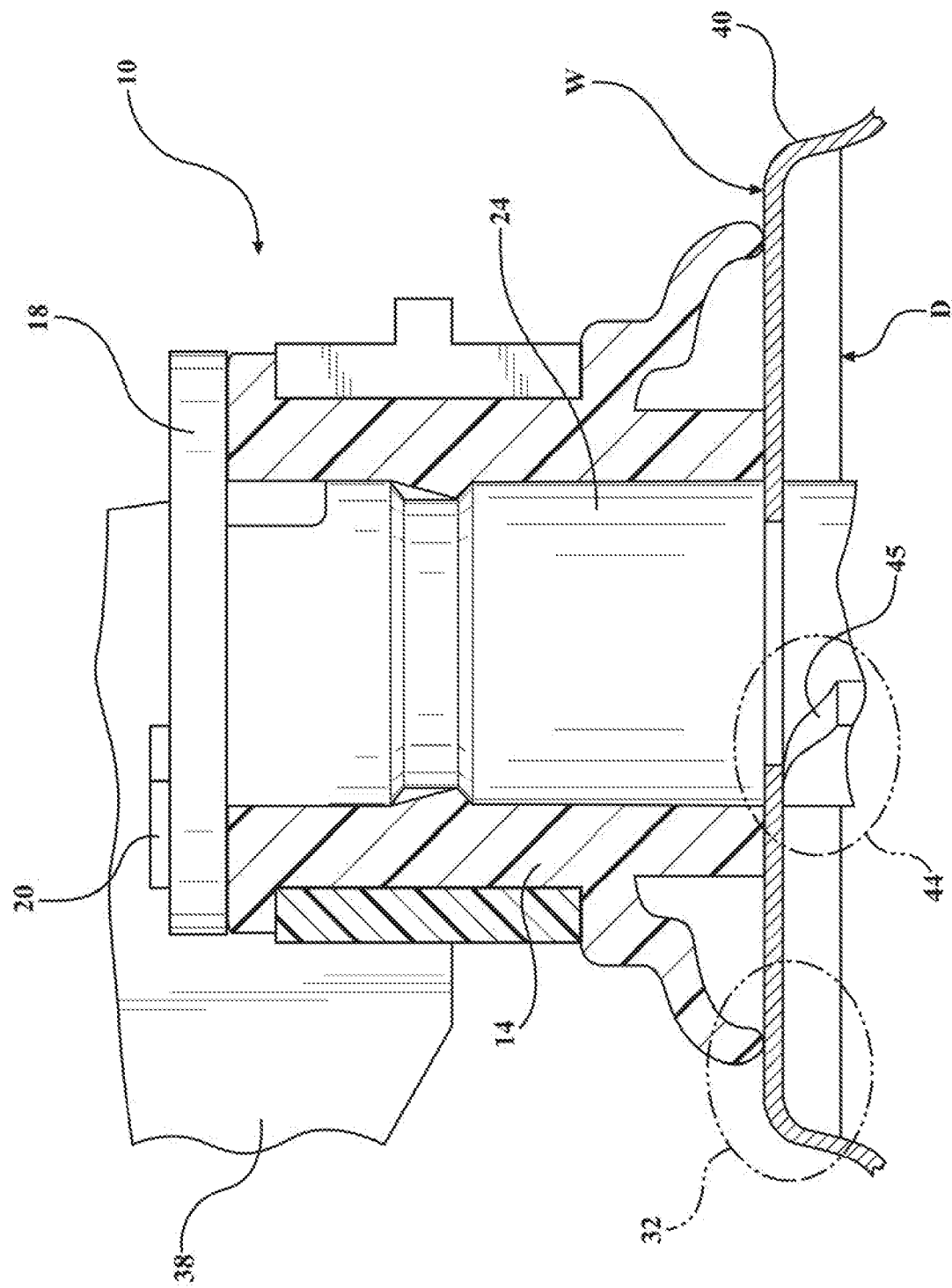
FIG. 5 is a cross-sectional view of an embodiment shown in FIG. 4.

Referring now to FIG. 5, a sectional view of the embodiment described in FIG. 4 is shown. Actuator fixing clip 12 (see FIG. 2C) is shown in a locked position, as indicated by indicator 20 on head portion 18, and is contained within isolation grommet 14. Isolation grommet 14 is secured to actuator 38 by receiver 16. Engagement portion 24 of actuator fixing clip 12 extends from head portion 18 through opening 42 (see FIGS. 2A-2C for example) of vehicle door sheet metal 40. Engagement tabs 44 of engagement portion 24 are shown engaging the "dry" side D of vehicle side door sheet metal 40, and causing flange 32 of isolation grommet 14 to be compressed (sealed) against the "wet" side W of vehicle door sheet metal 40. Engagement tabs 44 perform a dual function—first, engagement tabs 44, when in the locked position (as indicated by indicators 20 and/or projections 22), secure actuator 38 to the "wet" side W of vehicle door sheet metal 40 and second, when in the locked position, engagement tabs 44 due to the configuration of actuator fixing clip 12 and isolation grommet 14, cause flange 32 to be compressed and seal against the "wet" side W of vehicle door sheet metal 40, keeping water, noise, and/or other undesired materials from traveling through opening 42 in vehicle door sheet metal 40 to the "dry" side D. When in the locked position of engagement tabs 44, the flange 32 may alternatively or additionally cause a deformation of the sheet metal 40 to form the seal. For example flange 32 may be rigid, and/or be provided with a tapered engagement point 41 so as to assist such a deformation. Vibration may be also reduced since the actuator fixing clip 12 is separated from the actuator housing 39 by the isolation grommet 14.

Method

Figure 6:
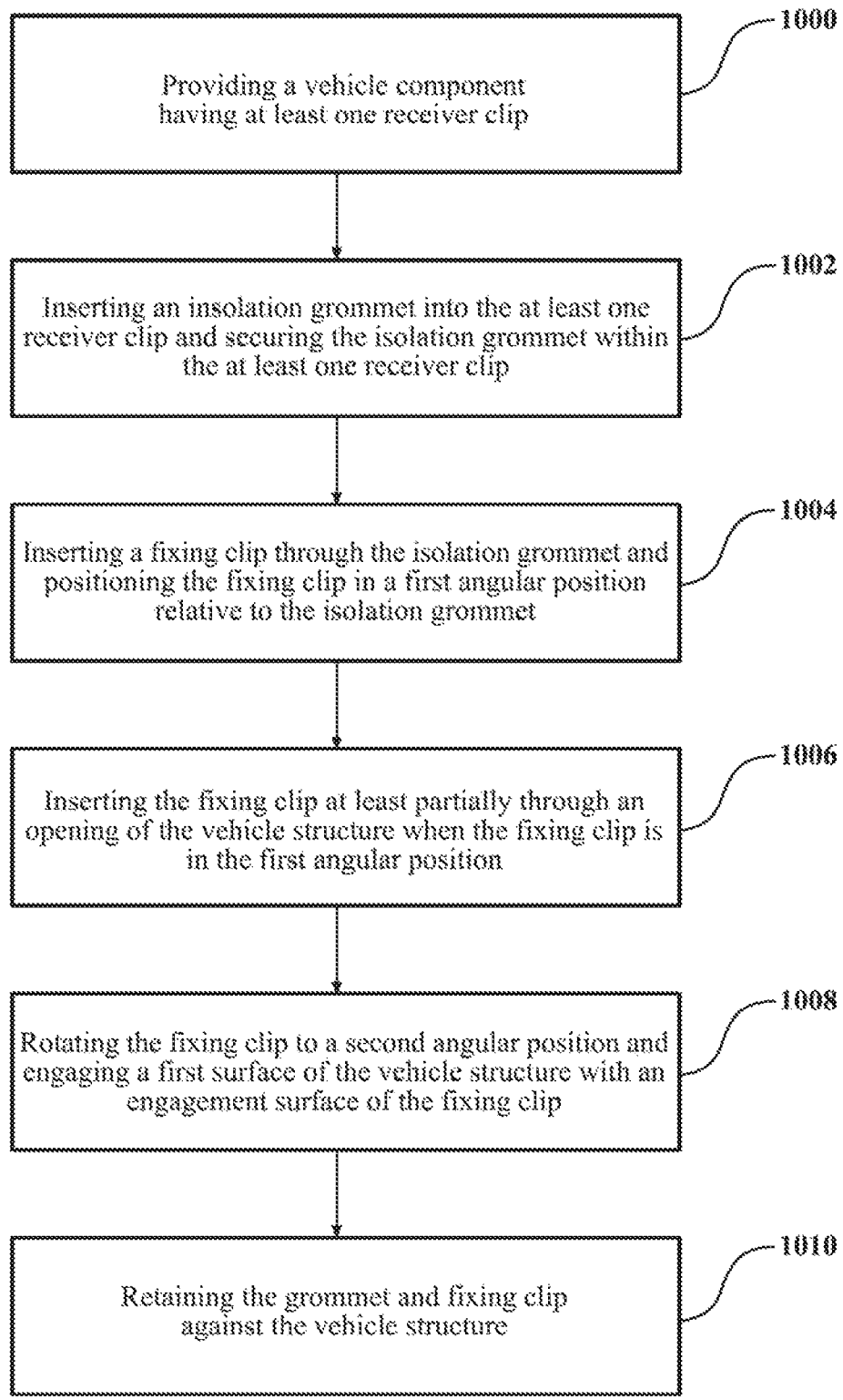
FIG. 6 is a flow chart illustrating a method of using the isolated fixing system.

FIG. 6 illustrates a flow chart corresponding to a method of using the fixing system 10 described herein. At step 1000, the method includes providing a vehicle component having at least one receiver clip. At step 1002, the method includes inserting an isolation grommet into the at least one receiver clip and securing the isolation grommet within the at least one receiver clip. At step 1004, the method includes inserting a fixing clip through the isolation grommet and positioning the fixing clip in a first angular position relative to the isolation grommet. At step 1006, the method includes inserting the fixing clip at least partially through an opening of the vehicle structure when the fixing clip is in the first angular position. At step 1008, the method includes rotating the fixing clip to a second angular position and engaging a first surface of the vehicle structure with an engagement surface of the fixing clip. At step 1010, the method includes retaining the grommet and fixing clip against the vehicle structure.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A fixing system for securing an actuator to a vehicle panel having a first side and a second side opposite the first side, comprising:
    an actuator fixing clip having an engagement portion configured to extend from the first side to the second side through an opening in the vehicle panel; and
    an isolation grommet configured to selectively engage the actuator fixing clip, the isolation grommet connected to the actuator positioned on the first side;
    wherein the actuator fixing clip is configured for securing the actuator to the vehicle, wherein in response to rotation of the actuator fixing clip the engagement portion engages with the second side.

2. The fixing system of claim 1, wherein the engagement portion is configured to rotate between a locked position and an unlocked position, wherein when in the locked position the engagement portion engages the vehicle for securing the actuator to the vehicle.

3. The fixing system of claim 1, wherein the actuator fixing clip further includes a head portion, and a guide portion, wherein the isolation grommet further includes a receiving portion configured to selectively engage the actuator fixing clip, wherein the actuator further includes a receiver integrated with the actuator to selectively receive the isolation grommet.

4. The fixing system of claim 3, wherein the actuator fixing clip is configured to rotate between a locked position and an unlocked position when inserted in the isolation grommet.

5. The fixing system of claim 4 wherein the head portion includes a locking position indicator.

6. The fixing system of claim 3 wherein the head portion includes at least one projection for indicating a first locking position and a second unlocking position.

7. The fixing system of claim 3, wherein the engagement portion of the actuator fixing clip engages the receiving portion of the isolation grommet when the actuator fixing clip is inserted into the isolation grommet.

8. The fixing system of claim 3, wherein the engagement portion of the actuator fixing clip includes at least one engagement tab configured to engage a surface adjacent an opening in a vehicle door.

9. The fixing system of claim 8, wherein the engagement portion of the actuator fixing clip, when inserted into the vehicle door, is rotatable via the head portion from an unlocked position to a locked position, fixing the actuator to the vehicle door.

10. The fixing system of claim 3, wherein the isolation grommet further includes a pair of isolation grommet tabs configured to engage the receiver.

11. The fixing system of claim 3, the isolation grommet further including a flange, wherein the flange of the isolation grommet is configured to engage a first surface of the vehicle to seal against the first surface of the vehicle and prevent water from passing from the first surface of the vehicle to a second surface of the vehicle through an opening in the vehicle.

12. The fixing system of claim 11, wherein the flange of the isolation grommet is deformable against the first surface of the vehicle.

13. The fixing system of claim 3, wherein the receiver is disposed about the actuator.

14. A fixing system for mounting a vehicle component to vehicle structure, the fixing system comprising:
a receiver defining an opening therein;
a grommet disposed within the opening of the receiver, wherein the grommet includes a receiving portion having an opening therethrough, wherein the grommet is fixed relative to the receiver in a predetermined orientation via corresponding structure of the grommet and the receiver; and
a fixing clip disposed through the opening of the grommet, wherein the fixing clip is rotatable between a first angular position and a second angular position relative to the grommet, wherein the first angular position permits installation and removal of the fixing system to and from the vehicle structure, and the second angular position fixes the fixing system to the vehicle structure and prevents removal from the vehicle structure;
wherein the vehicle component is disposed on a first side of the vehicle structure, and an engagement portion of the fixing clip engages an opposite side of the vehicle structure in response to rotating the fixing clip to the second angular position.

15. The fixing system of claim 14, wherein the grommet includes a flexible flange portion extending radially outward from the receiving portion, wherein the flexible flange portion has a first condition and a second condition, wherein the flange flexes from the first condition to the second condition in response to pressing the flexible flange portion against a surface of the vehicle structure.

16. The fixing system of claim 15, wherein the fixing clip holds the flange in the second condition against the vehicle structure when the fixing clip is in the second angular position.

17. A fixing system for securing an actuator to a vehicle, comprising:
an actuator fixing clip connected to the actuator and configured for securing the actuator to the vehicle, wherein the fixing clip engages an opposite side of a vehicle structure relative to a first side of the vehicle structure having the actuator positioned thereon;
where the actuator fixing clip has an engagement portion configured to extend from the opposite side to the first side through an opening in the vehicle structure.

18. The fixing system of claim 17, wherein the actuator fixing clip is configured to rotate between a locked position and an unlocked position, wherein when in the locked position the actuator fixing clip engages the vehicle for securing the actuator to the vehicle.

19. The fixing system of claim 17, further comprising:
an isolation grommet configured to selectively engage the actuator fixing clip, the isolation grommet connected to the actuator;
and
wherein the engagement portion is configured to engage the vehicle.

20. The fixing system of claim 19, wherein the engagement portion includes a pair of engagement tabs, wherein the engagement tabs directly contact vehicle door sheet metal of the vehicle and retain the fixing clip against the vehicle door sheet metal.

* * * * *